UNITED STATES PATENT OFFICE.

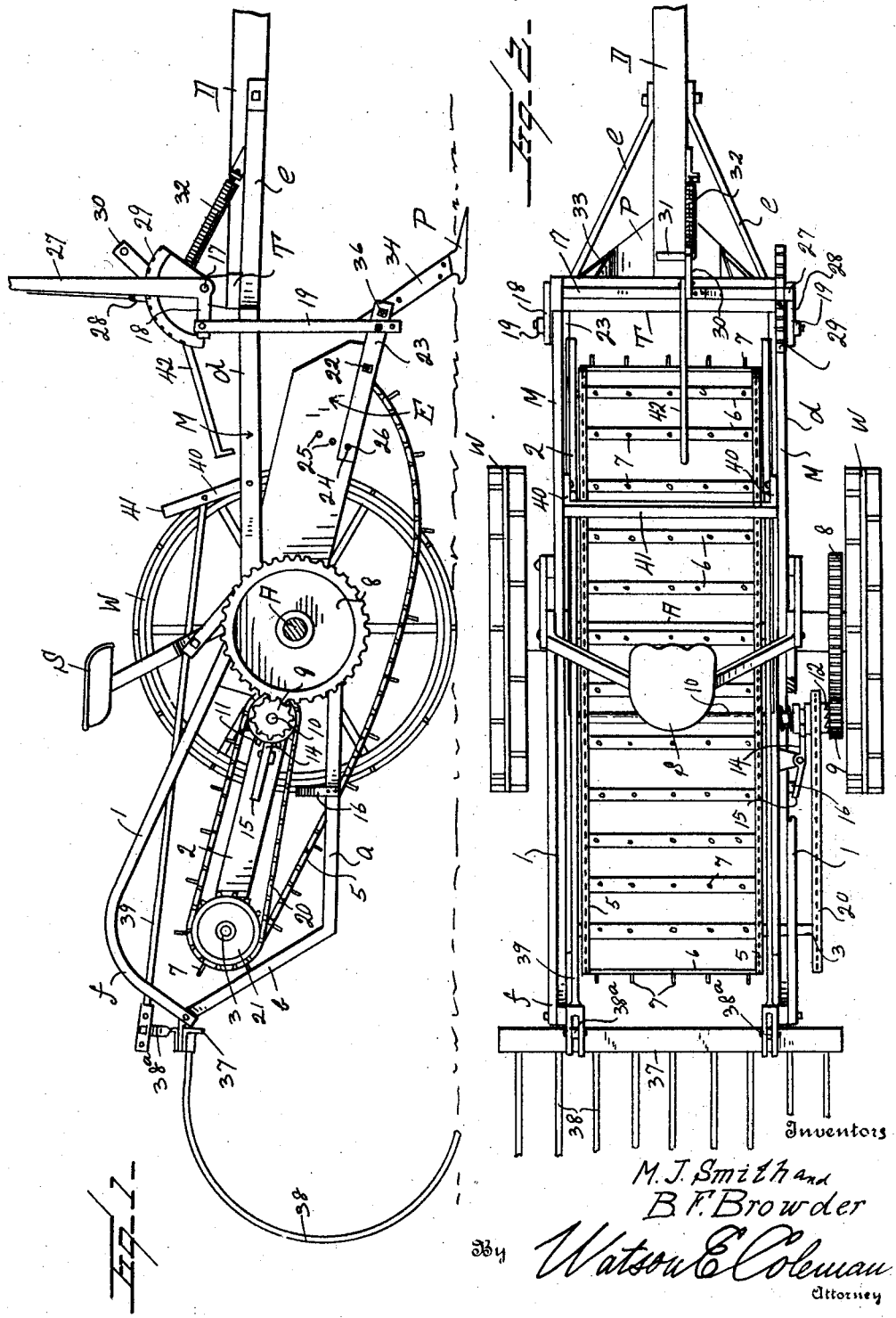

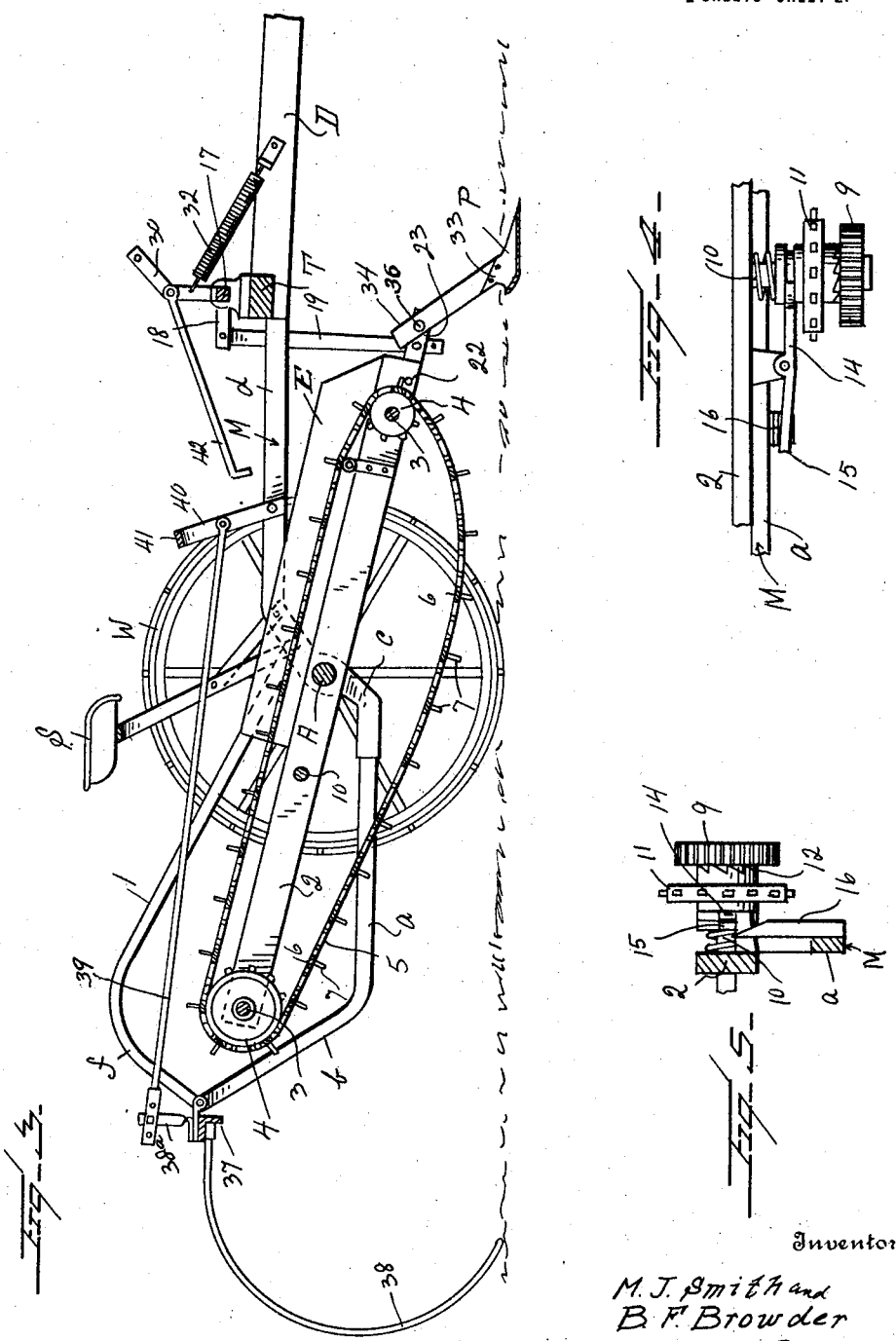

MORMAN J. SMITH AND BENJAMIN F. BROWDER, OF WEATHERFORD, TEXAS.

PEANUT-DIGGER.

1,389,015.  Specification of Letters Patent.  Patented Aug. 30, 1921.

Application filed July 23, 1919. Serial No. 312,702.

*To all whom it may concern:*

Be it known that we, MORMAN J. SMITH and BENJAMIN F. BROWDER, citizens of the United States, residing at Weatherford, in the county of Parker and State of Texas, have invented certain new and useful Improvements in Peanut-Diggers, of which the following is a specification, reference being had to the accompanying drawings.

This invention relates to certain improvements in peanut diggers, and it is an object of the invention to provide a novel and improved device of this general character wherein the plow or digging implement passes under the peanuts and cuts off the tap roots so that the soil does not lose the nitrogen contained within the root.

It is also an object of the invention to provide a novel improved device of this general character including a plow or digging implement for severing the plants from the tap roots together with means for elevating said severed plants to separate therefrom loose dirt or the like carried thereby.

Another object of the invention is to provide a novel improved device of this general character wherein is included a gathering rake for collecting the severed plants after the same have been subjected to the separating action of the elevator.

The invention consists in the details of construction and in the combination and arrangement of the several parts of our improved peanut digger whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be better understood, we will now proceed to describe the same with reference to the accompanying drawings, wherein:

Figure 1 is a view in side elevation of a peanut digger constructed in accordance with an embodiment of our invention.

Fig. 2 is a view in top plan of the device as herein embodied.

Fig. 3 is a longitudinal vertical sectional view taken through the device as herein disclosed.

Fig. 4 is an enlarged fragmentary view in top plan illustrating the mechanism for controlling the operation of the elevator.

Fig. 5 is an enlarged fragmentary view partly in elevation and partly in section of the mechanism particularly illustrated in Fig. 4.

As disclosed in the accompanying drawings A denotes a main or supporting axle having mounted upon the opposite end portions thereof the ground engaging wheels W. Engaged with the opposite end portions of the main or supporting axle A inwardly of the wheels W but in close proximity thereto are the side members M. Each of the side members M comprises a substantially horizontally disposed portion $a$ arranged rearwardly of the axle A and having its rear end continued by the upwardly and rearwardly inclined portion $b$. The forward end of the portion $a$ is continued by the upwardly and forwardly inclined portion $c$. The portion $c$ at its upper end is continued by a substantially horizontally disposed portion $d$ terminating in an inwardly inclined portion $e$ arranged in substantially the same horizontal plane as the portion $d$.

The central parts of the portions $c$ of the members M are engaged with the axle A and the inner or forward extremities of the portions $e$ of said members M are secured to the opposite side faces of the rear end portion of a draft pole D. The inner extremity of the pole D has secured thereto a transversely directed member T extending beyond the opposite sides of the pole D and having its opposite end portions secured to the inner part of the portions $e$ of the member M. By this arrangement the pole D is effectively engaged with the member M and thereby the desired draft of the machine is assured.

The upper or free extremities of the portions $b$ of the members M have secured thereto the extremities of the downwardly curved portions $f$ of the forwardly directed brace members 1. The forward extremities of the members 1 are suitably secured to the rear parts of the portions $d$ of the members M.

Suitably engaged and supported by the upper parts of the portions $c$ of the members M is a seat structure S of a conventional type.

Supported substantially midway their length by the axle for vertical swinging movement are the side members 2 of an elevator E and rotatably supported by the opposite end portions of the members 2 are the transversely disposed shafts 3. Fixed to the opposite end portions of the shafts 3 inwardly of the side members 2 but in close proximity thereto are the sprocket wheels 4 having engaged therewith the endless side chains 5. The chains 5 are connected at desired intervals by the transversely disposed straps or bars 6. Extending outwardly from each of said straps or bars 6 is a series of spikes or teeth 7 spaced longitudinally of said strap or bar 6.

Mounted upon the axle A between a side member 2 and the adjacent wheel W and rotating with said wheel is a gear wheel 8 meshing with a pinion 9 arranged rearwardly of said gear wheel 8 and carried by a shaft 10 rotatably supported by said side member 2. Loosely mounted upon said shaft 10 inwardly of the pinion 9 is a sprocket wheel 11. The opposed faces of the pinion 9 and the sprocket wheel 11 are provided with coacting clutching means 12 normally in locking engagement whereby the pinion 9 and sprocket 11 are caused to rotate in unison but adapted to be separated in the manner and for the purpose to be hereinafter more particularly referred to.

In the present embodiment of our invention the hub portion of the wheel has engaged therewith in a conventional manner a yoke 14 supported by the adjacent side member 2 for swinging movement in substantially a horizontal plane. The yoke 14 is provided with a tail 15 adapted to engage the upstanding cam trip 16 carried by the portion $a$ of the adjacent member M whereby the wheel 11 is disengaged from the pinion 9, upon elevating the forward end portion of the elevator E with the consequent lowering of the rear end portion thereof so that when the elevator E is moved out of working position the chains 5 become idle.

Rotatably supported by the transverse member T is a rock shaft 17 provided with the rearwardly directed rock arms 18. Pivotally enaged with each of the rock arms 18 is an end portion of the link 19. The opposite end portion of said link 19 is pivotally engaged with the forward end portion of a side member 2 so that upon imparting requisite rocking movement to the shaft 17 the forward end portion of the elevator E may be raised or lowered as the cases of practice may necessitate.

The sprocket 11 is in driving connection with the rear shaft 3 by the chain 20 engaged over said sprocket 11 and around a sprocket 21 affixed to an extended end portion of said upper shaft 3.

Pivotally engaged as at 22 with the outer face of the forward portion of each of the side members 2 is a central portion of an arm 23 extending in advance of said side members 2. The rear or inner end portion of the arm is provided with an opening 24 adapted to be brought into register with the vertically disposed arcuate series of openings 25 of the adjacent side member 2 and through which registering openings 24 and 25 is adapted to be directed a holding bolt 26 or the like. By this means the arm 23 may be held at different angles with respect to the longitudinal axis of the side member 2.

It is preferred that the lower portions of the links 19 be directly engaged with the forward portions of the arms 23 so that said arms 23 after the bolts 26 have been removed may be adjusted in unison and to the same degree about their pivots 22 upon proper rocking or rotation of the shaft 17.

The shaft 17 may be rotated or rocked in any desired manner but as herein disclosed we have engaged with the end portion thereof a hand lever 27 which lever is provided with the conventional type of latch mechanism 28 coacting with a stationary arcuate rack 29 carried by the transverse member T. We also find it of advantage to provide the shaft 17 with an upstanding rock arm 30 provided at its upper portion with a laterally directed pedal 31 so that the rocking movement of the shaft 17 in one direction may be further obtained by the use of the foot of the occupant of the seat structure S. We also find it of advantage to interpose between this rock arm 30 and the rear portion of the draft pole D a rectractile member 32 herein disclosed as a coiled spring and which member serves to automatically rock the shaft in one direction or in a direction to elevate the forward end portion of the elevator E and the parts carried thereby.

The plow or digging implement P is substantially flat and has its cutting or centering edge substantially V-shaped in form with the apex thereof forwardly directed. The opposite sides of the plow P at the rear thereof are provided with the upstanding wings 33 suitably anchored to the depending shanks 34. The upper end portions are adjustably secured as at 36 to the forward end portions of the arms 23.

Interposed between and pivotally engaged with the upper or free extremities of the portions $b$ of the members M is a rake head 37 to which are secured the rearwardly directed and curved tines 38. The rake at 37 adjacent its opposite ends is provided with the upstanding and substantially parallel rock arms 38$^a$. Pivotally engaged with each of the rock arms 38$^a$ is a forwardly directed arm 39 pivotally engaged with a side member 40 of the swinging member 41. The swinging member 41 is in the form of an inverted U and has the free extremities of its side members 40 pivotally engaged with the portions *d* of the members M. Upon swinging the member 41 forwardly the tines 38 are elevated or raised into an inoperative position and vice versa.

In order to maintain the tines 38 in their raised or inoperative position we employ the hook member 42 pivotally engaged with the rock arm 30 and which is engaged with the member 41 when swung or moved forwardly to raise or elevate the tines 38.

The plow or digging implement P is positioned a distance in advance of the elevator E sufficient to penetrate the soil deep enough to pass under the peanuts to be harvested and sever said plants or vines from the tap roots so that the tap roots will be retained to preserve the soil as the soil does not lose the nitrogen contained within the roots. After the plants or vines have been thus severed the spikes or teeth 7 comprised in the elevator E pull said vines or plants out of the ground or soil with a jerk and carry them outwardly. The vibration of the elevator E shakes off the loose dirt or the like carried by the plants or vines and said elevator drops said vines or plants carried thereby in advance of the lowered tines 38 whereby the rake operates to windrow the vines or plants in a fairly clean condition.

From the foregoing description, it is thought to be obvious that a peanut digger constructed in accordance with our invention is particularly well adapted for use by reason of the convenience and facility with which it may be assembled and operated and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. A peanut digger comprising a portably supported axle, transversely spaced members supported by said axle for vertical swinging movement, means for imparting movement to said members, an arm pivotally engaged substantially midway its length with each of said side members and extending in advance of the forward end thereof, means for holding each of said arms against pivotal movement, and a ground digging implement secured to the forward portion of each of the arms.

2. A peanut digger comprising a portably supported axle, side members supported by said axle and extending forwardly and rearwardly thereof, the rear end portions of said members being upwardly directed, a draft pole secured to the forward end portions of said side members, brace members secured to the rear extremities of the side members and to the central portion thereof, a ground digging member supported by the axle for vertical movement, and means supported by the forward end portions of the side members and operatively engaged with the plow for imparting vertical movement thereto.

In testimony whereof we hereunto affix our signatures in the presence of two witnesses.

MORMAN J. SMITH.
BENJAMIN F. BROWDER.

Witnesses:
J. S. HUDDLESTON,
TAYLOR JOHNSON.